May 9, 1933.  A. C. DAMAN  1,907,747
LABORATORY FILTER
Filed Nov. 22, 1930  3 Sheets-Sheet 1

Inventor
ARTHUR C. DAMAN
By R. H. Galbreath
Attorney

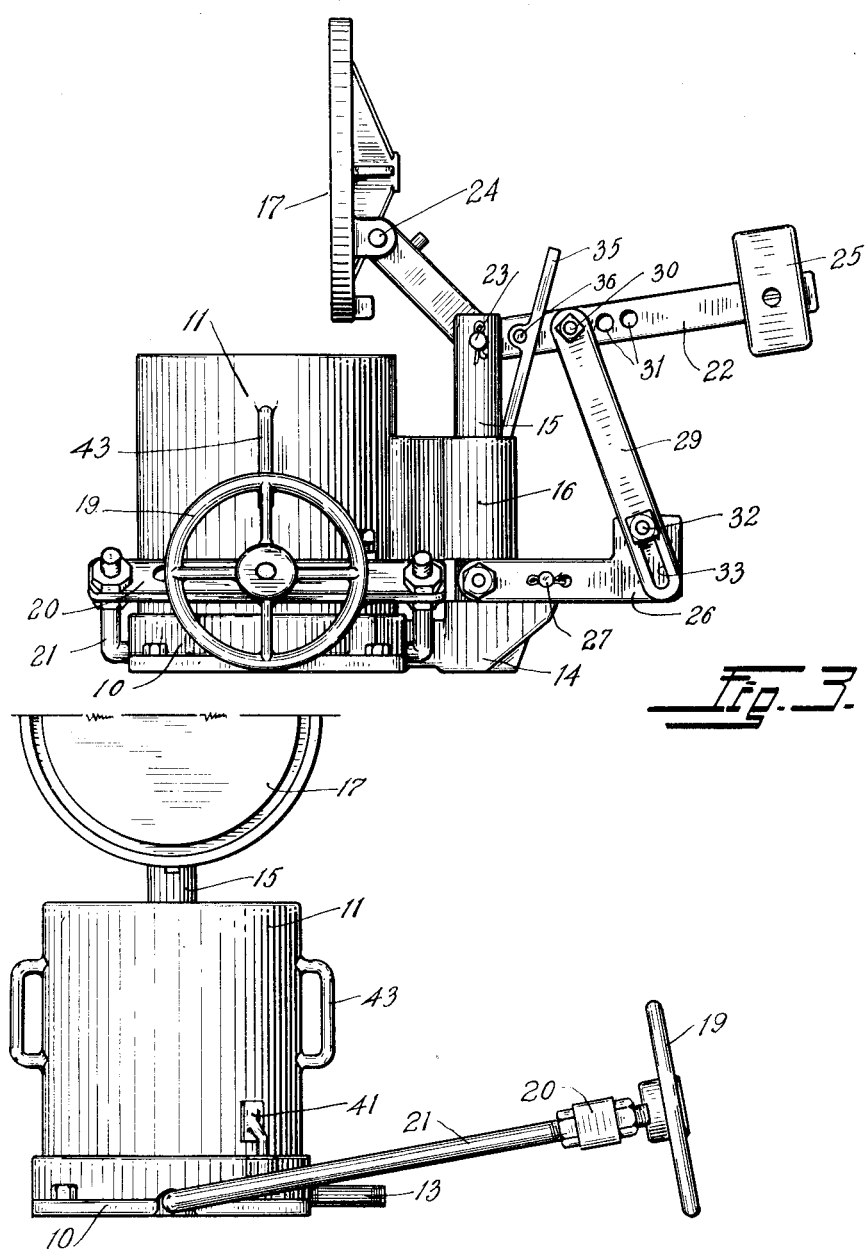

Inventor
ARTHUR C. DAMAN

Patented May 9, 1933

1,907,747

UNITED STATES PATENT OFFICE

ARTHUR C. DAMAN, OF DENVER, COLORADO

LABORATORY FILTER

Application filed November 22, 1930. Serial No. 497,468.

This invention relates to a filter, more particularly to a filter adaptable for use in a laboratory for filtering sample solutions of ore pulp, etc. The principal object of the invention is to provide a neat, compact, and easily manipulated filtering mechanism which will allow quick access for filling and quick and easy removal of the filter cake.

Another object of the invention is to so construct the filter that the reservoir may be completely lifted from the filter cake at the conclusion of the filtering operation.

A further object of the invention is to so construct the device that it can be quickly and securely sealed so as to permit of either pressure or vacuum filtering.

A still further object of the invention is to so construct the device that the reservoir can not be opened until the pressure therein has been relieved so as to prevent disastrous accidents.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 3 is a side elevation of the improved filter illustrating it in position ready to receive the solution.

Fig. 4 is a front elevation of the filter in the position of Fig. 3.

Figure 1:
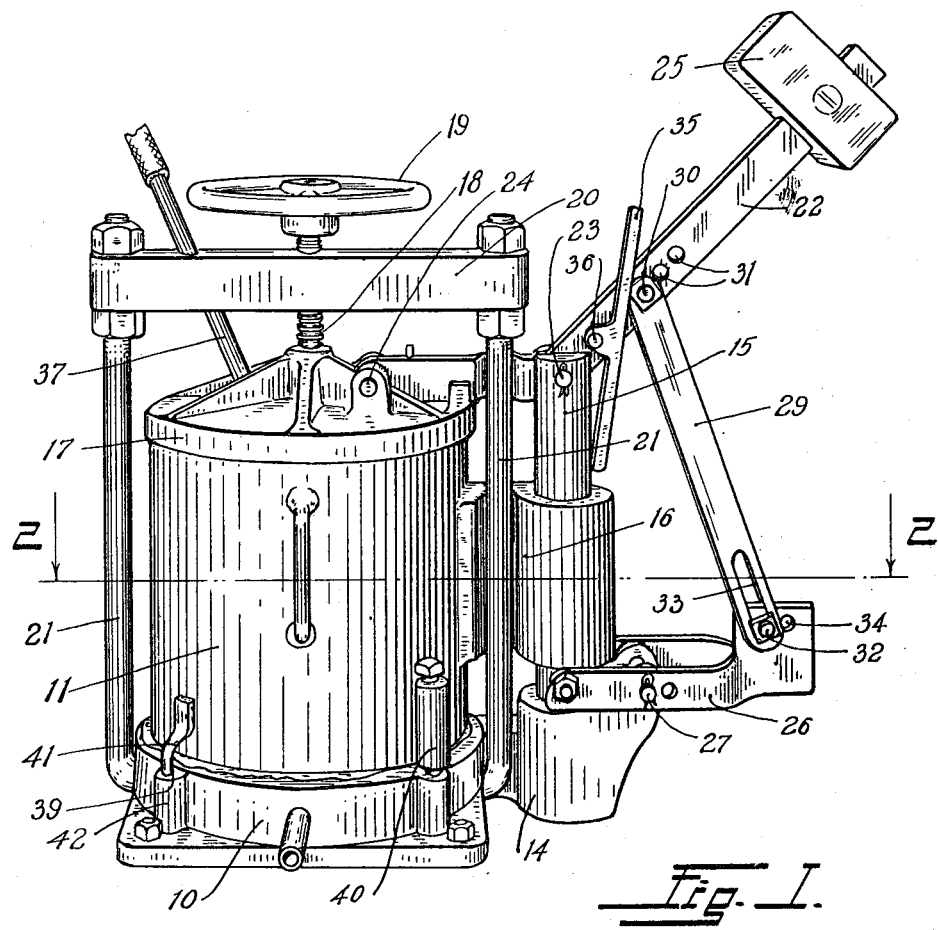
Fig. 1 is a perspective view of the complete invention.
Figure 2:
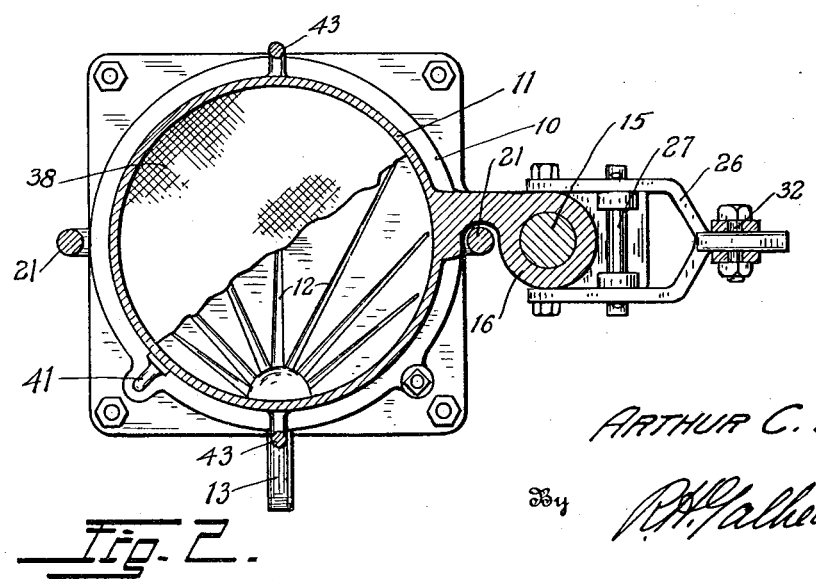
Fig. 2 is a horizontal section therethrough, taken on the line 2—2, Fig. 1.

The invention comprises a base member 10 forming a circular pedestal for the support of a cylindrical reservoir 11. The portion of the base casting 10, which forms the bottom of the reservoir 11 is provided with a series of drainage grooves 12 which conduct the filtrate to a discharge conduit 13. The grooves 12 are covered by a screen mesh 38. The screen 38 may be covered with the desired filter paper, cloth, or other filter medium 39. A bracket arm 14 extends from the base casting 10 and rigidly supports a vertical standard 15. A reservoir bracket arm 16 extends from the reservoir 11 and slidably surrounds the standard 15.

The reservoir 11 is closed by means of a tight fitting lid 17, which may be clamped thereon by means of a clamp screw 18 and a hand wheel 19. The lid 17 is threaded or otherwise fitted to receive the extremity of a pressure pipe 37 which passes through a yoke 20.

The clamp screw 18 is threaded through the yoke 20 which extends between yoke arms 21. The lower extremities of the yoke arms 21 are turned into suitable sockets in the front and back of the base casting 10 so that they are free to swing to either side of the reservoir 11.

A counterweight lever 22 is hinged at the upper extremity of the standard 15 upon a hinge pin 23. The shorter extremity of the lever 22 connects by means of a second hinge pin 24 with the lid 17. The longer extremity of the counterweight lever 22 is provided with a suitable counterweight 25 the position of which can be adjusted along the lever. A stop bar 35 is pivoted to the arm 22 as shown at 36.

A bifurcated lifting yoke 26 is hinged at 27 upon the bracket 14 and is provided at its extremities with suitable rollers 28, which contact with the under surface of the reservoir bracket 16. The lifting yoke is connected to the counterweight lever 22 by means of one or more connecting rods 29. The connecting rods are connected to the counterweight by means of a bolt 30, the position of which can be adjusted along the lever 22 in a series of bolt holes 31. It is connected to the yoke 26 by means of a bolt 32 which passes through slotted openings 33 in the connecting rods 29 and through one or more adjustment holes 34 in the yoke.

Use

Let us assume that the filter medium 39 is in place and that the device is in the position of Fig. 1. It will be noted that the yoke 20 and the hand wheel 19 have been swung to one side and the counterweight 25 has lifted the lid 17 from the reservoir 11. The lid is turned upon its pivot to allow free access to the entire top of the reservoir.

The stop bar 35 is being pressed downwardly against the upper surface of the reservoir bracket 16 by the weight of the counterweight 25, to firmly clamp the reservoir in place and prevent leakage at the base. The position of the yoke 26 has not been disturbed since the elongated slots 33 have allowed the desired movement of the connecting rods 29.

In this position the solution to be filtered is poured into the reservoir 11 and the lid 17 is pulled downwardly to close the top of the reservoir. The yoke 20 is swung over the lid and the hand wheel 19 is tightened to clamp the lid 17 against the reservoir and the reservoir against the base. It also acts to clamp the filter medium 39 between the reservoir and the base.

If only gravity filtration is desired, the filtrate will be allowed to flow naturally from the discharge conduit 13. If pressure filtration is desired the pressure pipe 37 is connected through the lid 17 and pressure is applied to the solution in the reservoir by means of compressed air or other pressure medium. This pressure, of course, facilitates the forcing of the filtrate through the filtering medium. If vacuum filtering is desired, a vacuum pump is connected with the discharge conduit 13.

After the desired filtering has been completed, the hand wheel 19 is loosened and the yoke 20 is swung to the position of Fig. 4. It will be noted that the yoke can not be swung to the latter position until the pressure pipe 37 has been disconnected from the lid and withdrawn through the yoke 20. This forces the operator to relieve the pressure in the reservoir 11 before swinging the protecting yoke bar 24 to the side. The lid is now lifted to the position of Fig. 3 and if desired additional solution can be poured into the reservoir while the counterweight 25 and the stop bar 35 maintain a tight joint between the reservoir and its base.

Figure 5:
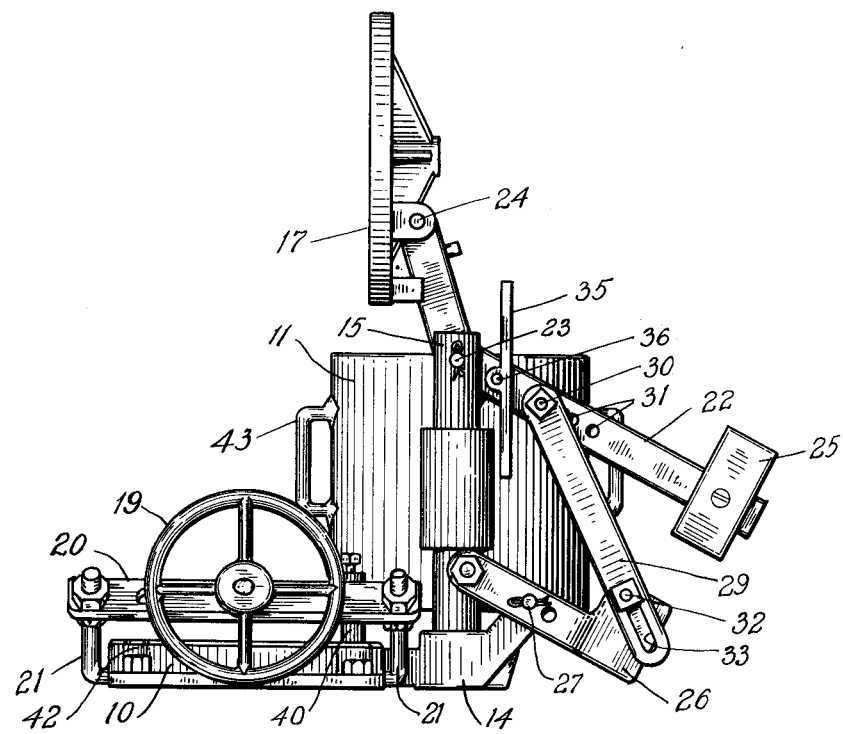
Fig. 5 is a side elevation of the improved filter illustrating it in position for removal of the filter cake or for insertion of the filter medium.

Should the filtering operation be completed the stop bar 35 is swung so as to avoid the reservoir bracket 16 which allows the counterweight 25 to move downwardly to the position of Fig. 5. This further movement of the counterweight 25 causes the connecting rods 29 to rotate the bifurcated yoke 26 so that the rollers 28 will lift the bracket 16 and the reservoir 11 from the base 10, so as to expose the filter cake.

Figure 6:
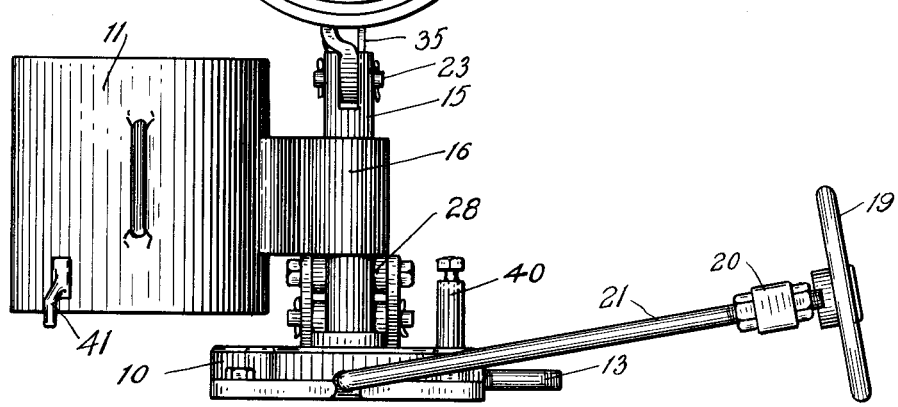
Fig. 6 is a front elevation of the filter in the position of Fig. 5.

The reservoir can now be swung to the right upon the rollers 28, with its bracket 16 rotating about the standard 15, to the position illustrated in Figs. 5 and 6. This allows the operator free access to the filter cake for removal or other operations thereon.

A rubber tube bumper 40 is provided to stop the return swing of the reservoir and a pointer 41 is also provided for aligning the reservoir to its proper position on the base 10. The pointer 41 enters an aligning opening formed in a boss 42 on the base 10. Suitable handles 43 project from the sides of the reservoir 11 to facilitate handling and aligning thereof.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:—

1. A filter comprising: a base; a reservoir adapted to rest upon said base; means for draining filtrate from said base; a filter medium positioned between said base and the interior of said reservoir; a lid for said reservoir; means for clamping said lid in place; means for lifting said lid, said latter means comprising: a counterweight lever hingedly supported intermediate its extremities, one extremity of said lever connecting with said lid; and a counterweight carried by the other extremity of said lever; and means associated with said counterweight lever for lifting said reservoir from said base.

2. A filter comprising: a supporting base having a filtrate passage; a reservoir adapted to rest upon said base over said passage; a standard supported from said base alongside said reservoir; a bracket extending from said reservoir and arranged to rotate about and move vertically upon said standard so as to allow said reservoir to be lifted from said base and swing to one side; a lid adapted to close said reservoir; a counterweight lever fulcrumed on said standard and connecting at one extremity with said lid; a lifting lever fulcrumed on said base and adapted to contact with said reservoir bracket to lift the latter; and a connecting rod connecting said counterweight lever with said lifting lever so as to operate the latter.

3. A filter comprising: a supporting base having a filtrate passage; a reservoir adapted to rest upon said base over said passage; a standard supported from said base alongside said reservoir; a bracket extending from said reservoir and arranged to rotate about and move vertically upon said standard so as to allow said reservoir to be lifted from said base and swing to one side; a lid adapted to close said reservoir; a counterweight lever fulcrumed on said standard and connecting at one extremity with said lid; a lifting lever fulcrumed on said base and adapted to contact with said reservoir bracket to lift the latter; a connecting rod connecting said counterweight lever with said lifting lever so as to operate the latter at the termination of a limited movement of said counterweight lever.

4. In a filter, a reservoir, a lid for the reservoir, mechanism for holding the lid in its closed position, including a yoke, and a pressure pipe removably associated with the yoke, and communicating with the reservoir, to prevent removal of the lid while the pressure pipe is in communication with the reservoir.

5. A filter comprising a reservoir having a lid, a pressure pipe communicating with the reservoir by connection with the lid, and holding means for the lid and the pressure pipe, the pipe being separately movable to prevent a separate removal of the lid, by adjustment of the holding means.

6. In a filter, a reservoir, a lid for the reservoir, mechanism for holding the lid in its closed position, including a yoke, and a pressure pipe movable on the yoke, and communicating with the reservoir to prevent removal of the lid until after removal of the pressure pipe from the reservoir.

7. A filter comprising a base, a reservoir and a lid assembled for the removal of the lid from the reservoir, and for removal of the reservoir from the base, pressure means to lock the parts in their cooperative position, and a lever-system to effect the removal of the lid by movement of parts comprised in the system, and by continued movement of same to remove the reservoir from the base.

8. A filter comprising a base, a reservoir and a lid assembled for the removal of the lid from the reservoir, and for removal of the reservoir from the base, pressure means to lock the parts in their cooperative position, and a lever-system to effect the removal of the lid by movement of parts comprised in the system, and by continued movement of same to remove the reservoir upwardly and then laterally with relation to the base.

9. A filter comprising a base, a reservoir supported by the base, a lid for the reservoir, a lever adapted to lift the lid from the reservoir, a lever adapted to lift the reservoir from the base, and a member connecting the levers whereby movement of one lever will be communicated to the other.

10. A filter comprising a base, a reservoir supported by the base, a lid for the reservoir, a lever adapted to lift the lid from the reservoir, a lever adapted to lift the reservoir from the base, a member connecting the levers whereby movement of one lever will be communicated to the other, and means for allowing a limited movement of said connecting member to permit the first lever to move a predetermined distance before operating the second lever.

11. A filter comprising a base, a reservoir supported by the base, a lid for the reservoir, a standard supported from said base, a bracket extending from the reservoir and rotatably mounted on the standard, a counterweight lever fulcrumed on the standard and connected with the lid, a lifting lever fulcrumed on the base, and adapted to lift the reservoir bracket, a rod connecting the levers whereby to operate the lifting lever after termination of a limited movement of the counterweight lever, and a stop member adapted to stop the movement of the counterweight lever.

12. A filter comprising a base, a reservoir supported by the base, a lid for the reservoir, a standard supported from said base, a bracket extending from the reservoir and rotatably mounted on the standard, a counterweight lever fulcrumed on the standard and connected with the lid, a lifting lever fulcrumed on the base, and adapted to lift the reservoir bracket, a rod connecting the levers whereby to operate the lifting lever after termination of a limited movement of the counterweight lever, a stop member adapted to stop the movement of the counterweight lever, and said stop members adapted to contact the reservoir bracket to force the reservoir against the base when the lid is lifted.

In testimony whereof, I affix my signature.

ARTHUR C. DAMAN.